United States Patent

[11] 3,613,641

| [72] | Inventor | Petrus Jacobus Geerlings<br>P.O. Box 179, Waterloo, Iowa 50704 |
|---|---|---|
| [21] | Appl. No. | 22,945 |
| [22] | Filed | Mar. 26, 1970 |
| [45] | Patented | Oct. 19, 1971 |

[54] AUTOMATIC ELECTRIC HOG FEEDER
9 Claims, 12 Drawing Figs.

[52] U.S. Cl. ...................................................... 119/51.11, 119/52
[51] Int. Cl. ...................................................... A01k 5/02, A01k 39/00
[50] Field of Search ........................................... 119/51.11, 52, 56, 52 A, 52.1

[56] References Cited
UNITED STATES PATENTS

| 1,818,419 | 8/1931 | Miller | 119/52 A |
|---|---|---|---|
| 2,484,967 | 10/1949 | Sodders | 119/52.1 |
| 2,485,832 | 10/1949 | Keagle | 119/52 A |
| 2,745,539 | 5/1956 | Hazen | 119/52 R |
| 2,747,546 | 5/1956 | Winter | 119/52 R |
| 2,867,190 | 1/1959 | Rutten | 119/52 R |
| 3,068,839 | 12/1962 | Bruecker | 119/52 R |
| 3,302,617 | 2/1967 | Bares et al. | 119/52 R |
| 3,547,081 | 12/1970 | Geerlings | 119/52 R |

*Primary Examiner*—Aldrich F. Medbery
*Attorneys*—A. Yates Dowell and A. Yates Dowell, Jr.

ABSTRACT: Apparatus for dispensing feed to animals automatically, including large and small pigs, and with control means for operating the mechanism intermittently to maintain a supply of feed ready for consumption.

PATENTED OCT 19 1971 3,613,641

INVENTOR
PETRUS J. GEERLINGS

BY
ATTORNEYS

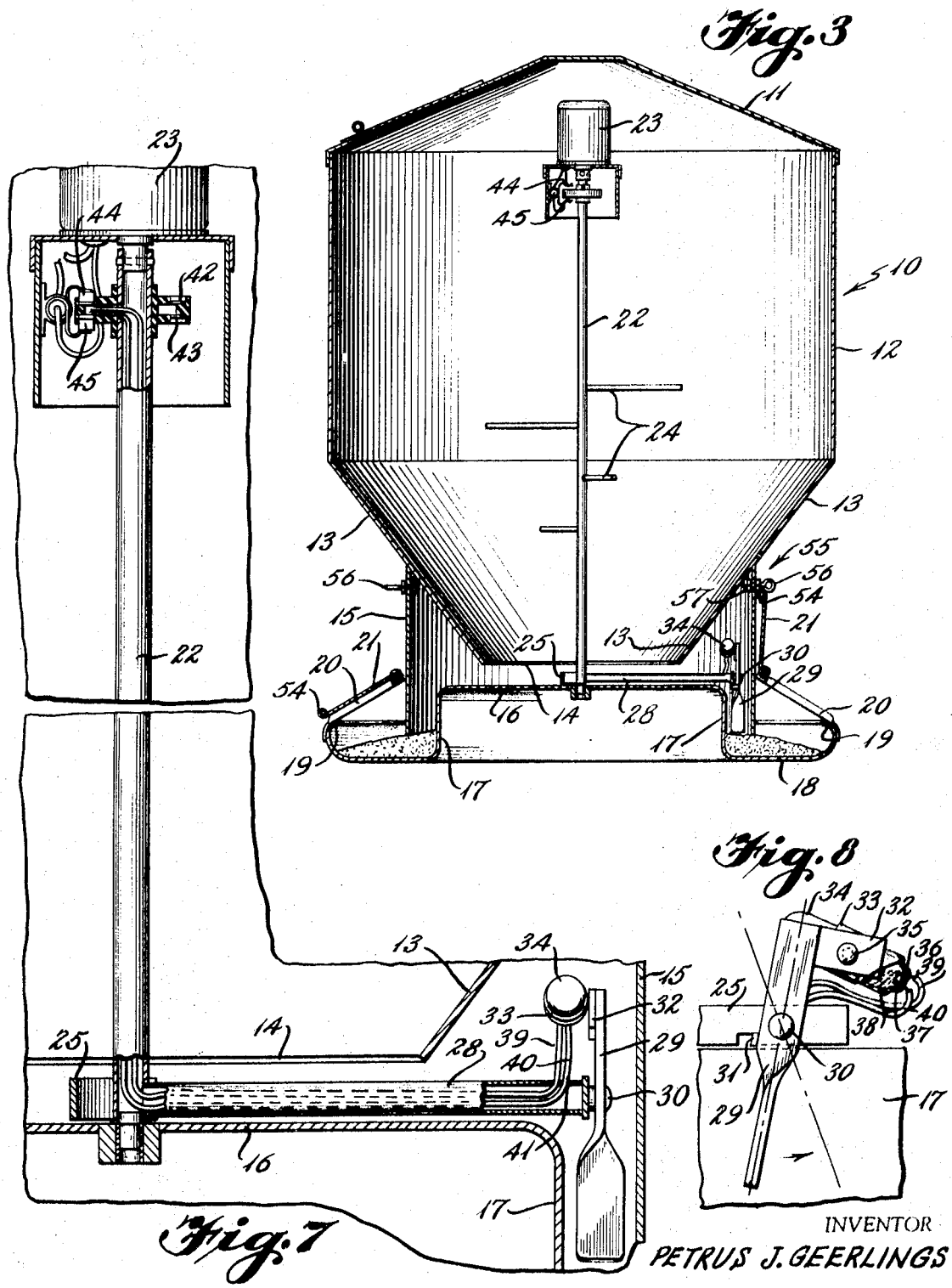

INVENTOR
PETRUS J. GEERLINGS

ATTORNEYS

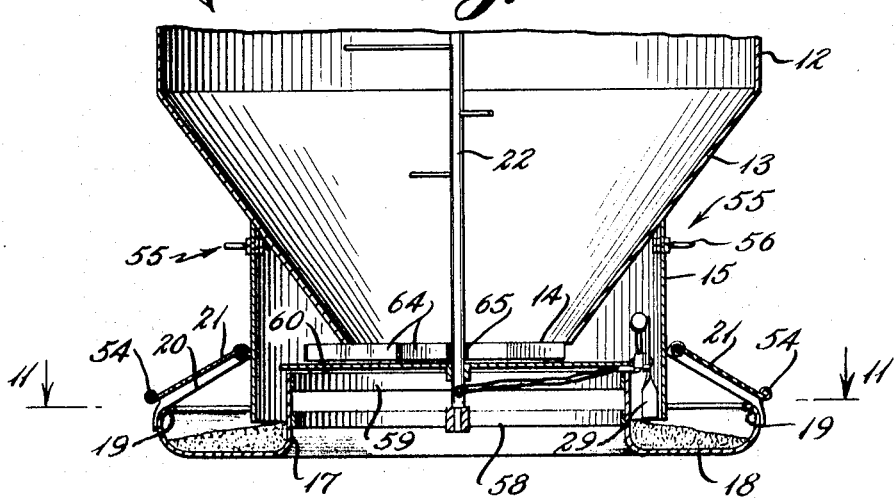
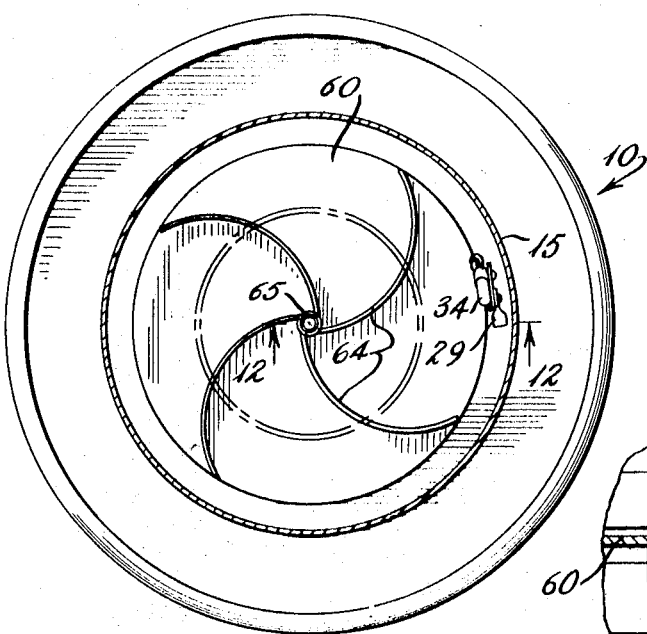
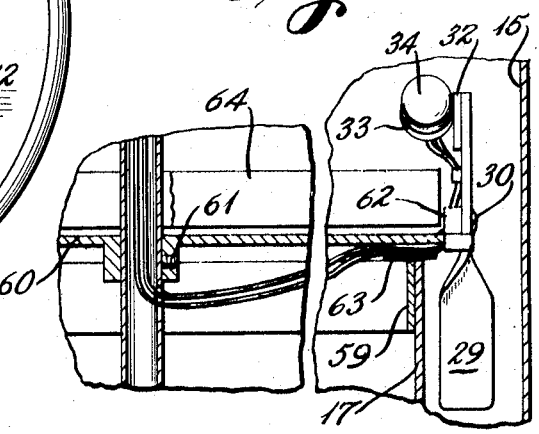
INVENTOR
PETRUS J. GEERLINGS
BY
ATTORNEYS

3,613,641

AUTOMATIC ELECTRIC HOG FEEDER

BACKGROUND OF THE INVENTION

1. Field of the Invention

The invention is in the field of animal feeders which hold a supply of feed in bulk, with means for the discharge of such feed to maintain a supply available for consumption by animals.

2. Description of the Prior Art

Feeders of various kinds have been provided for holding feed in bulk and for dispensing the same for consumption by animals. These have not been satisfactory because they did not meet all the needs, including the ready availability of feed for pigs of all sizes including very small, and they were expensive, inefficient, required too much attention, and did not keep feed available at all times and were unsatisfactory for other reasons.

SUMMARY OF THE INVENTION

The present invention includes a bin or hopper with an open bottom located in a substantially horizontal plane, from which feed can be discharged and spaced beneath such open bottom is an elevated floor around the outer periphery of which is disposed a recessed annular trough to which feed is supplied from the bin or hopper. The space between the floor and the open bottom of the bin influences the volume of the discharge of the feed and such discharge is facilitated by the use of agitator means designed to move or sweep the feed outwardly over the rim or brink of the floor into the surrounding trough. This is accomplished either by having an agitator arm fixed and the floor rotated, or by having the floor stationary and the agitator arm rotated. In either case the rotating parts are mounted on a central or axial upright shaft and driven by an intermittently operated powerplant. The operation of the powerplant and the dispensing of feed is controlled by means of a time switch as well as a pivoted lever in the trough which lever operates a mercury switch.

OBJECTS OF THE INVENTION

It is an object of the invention to provide a simple, inexpensive, practical, fully automatic feeder for livestock which will maintain feed in the trough, ready for consumption at all times, as well as a feeder in which the driving motor is out of contact with the feed, preferably overhead, and the control mechanism likewise is housed in a protected position where its operation will not be interfered with by the feed.

Another object of the invention is to provide a fully automatic feeder with no exposed operating parts likely to cause injury to the animals being fed, which will require minimum attention without adjustment, and a feeder which will supply any kind of feed, straight, mixed, and with a continuous trough so that there will be no waste over the sides of the same.

A further object of the invention is to provide a feeder with covers or doors for the trough which may be selectively retained in noncovering position, insuring greater consumption of feed and more rapid growth of the animals, and requiring minimum effort on the part of the pigs to reach the feed and thereby reducing irritation and the rubbing of dirt from the animal's head into the feed and consequent spread of disease resulting therefrom.

BRIEF DESCRIPTION OF THE DRAWINGS

FIG. 3 is a vertical section on the line 3—3 of FIG. 1.

FIG. 7 is an enlarged fragmentary detailed view of the trough feed level control mechanism.

FIG. 8 is an end elevation of the structure of FIG. 7.

FIG. 10 is a fragmentary section similar to FIG. 3 of a modified form of the invention.

FIG. 11 is a section on the line 11—11 of FIG. 10.

FIG. 12 is an enlarged fragmentary detail action of the trough feed level control mechanism.

DESCRIPTION OF THE PREFERRED EMBODIMENTS

Figure 1:
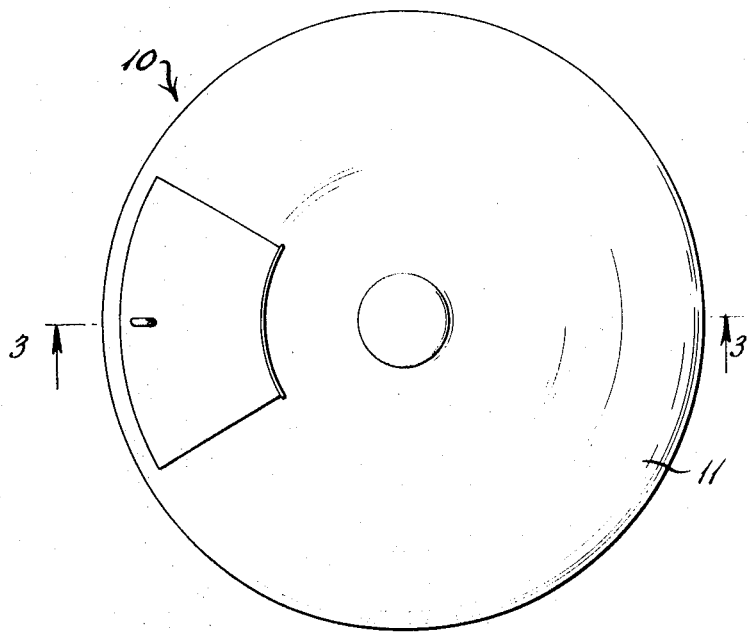
FIG. 1 is a top plan view of the animal feeder of the present invention.

With continued reference to the drawings, the present invention is an animal feeder including a bulkfeed bin 10 which may be of conventional character with a vertical axis and with a cover 11. The bin 10 includes a generally cylindrical wall 12 connected to a lower frustoconical wall 13 having its small lower open end 14 in generally horizontal position. An annular generally cylindrical skirt 15 is welded or otherwise connected to the frustoconical wall 13 and extends downwardly therefrom.

Spaced below the open end 14 of the frustoconical wall is a floor 16 of generally circular character connected to an annular downwardly extending wall 17 forming part of an outwardly extending trough 18 with an upturned lip 19. In view of the fact that the lower end of the frustoconical wall 13 which forms the discharge from the bulk feedbin is equally spaced from the periphery of the floor 16, uniform discharge of feed is obtained. The trough 18 may be open at the top or may have a cover 20 connected to the skirt 15 and extending outwardly and downwardly to a position overlying the lip 19. The cover 20 has a plurality of selectively openable doors 21 hingedly mounted thereon which can be raised by the animals to obtain feed.

In order to insure movement of feed within and from the bulk feedbin, a vertically disposed hollow drive shaft 22 is mounted axially within the bin and preferably is driven by an electric motor or other powerplant plant 23 attached to the upper end of the same. If desired, such shaft may have agitator fingers 24 to break up the feed so that it will gravitate to the open end 14. Attached to the lower end portion of the shaft is a curved sweep arm 25 located adjacent to the floor 16 and extending outwardly beyond the wall 17. As the arm 25 is rotated by the shaft 22, it sweeps feed from the floor 16 over the periphery thereof and into the trough 18.

A tubular support arm 28 extends generally radially outwardly from the drive shaft 22 to a position outwardly of the periphery of the floor 16 where it is attached to and supports the outer end of the sweep arm 25. On the outer end of the support arm 28, a paddle 29 or feed level control lever is swingably mounted intermediate its ends on a pivot pin 30 and such paddle normally rests against a stop 31 carried by the sweep arm 25. An extension arm 32 is attached to one side of the upper end portion of the paddle 29 and is adapted to support a holder 33 in which a mercury switch or other electrical contact 34 is mounted. Preferably the holder is angularly adjustable relative to the extension arm 32 in any desired manner, as by a friction pivot 35, so that the amount of movement of the paddle can be varied. In other words, in the position shown in FIG. 8, the paddle 29 can engage a buildup of feed in the trough and rotate a short distance before the globule of mercury in the switch 34 breaks the flow of electricity to the powerplant 23. By rotating the holder 33 in either direction, the amount of movement of the paddle will be varied. Normally the offset weight of the extension arm 32 and the switch 34 are sufficient to maintain the paddle 29 in the position illustrated in FIG. 8 when the paddle is not engaging feed within the trough 18; however, it is contemplated that a light spring could be provided for moving the lower portion of the paddle against the stop 31.

In order for the mercury switch 34 to control the powerplant 23, such switch is provided with a pair of contacts 36 and 37 within the bulb of the mercury switch. A globule of mercury 38 is freely movably carried by the bulb in such a manner that when the bulb is tilted, the globule of mercury spans the contacts 36 and 37 to complete an electrical current, and when the paddle 29 is moved so that the globule of mercury gravitates away from the contacts, the flow of electrical energy will be interrupted. The contacts 36 and 37 are carried by electrical lines 39 and 40, respectively, which extend through an opening 41 into the support arm 28 and then up the interior of the hollow shaft 22. At the upper end of the shaft, the lines 39 and 40 are connected to rotor strips 42 and 43, respectively, which are engaged by brushes 44 and 45. One of the brushes is connected to an on-off switch 46 and a timing mechanism 47 which is connected to one side of the powerplant 23. The other brush is connected to an electrical supply lead 48, while the other side of the powerplant 23 is connected to an electrical supply lead 49.

Figure 2:
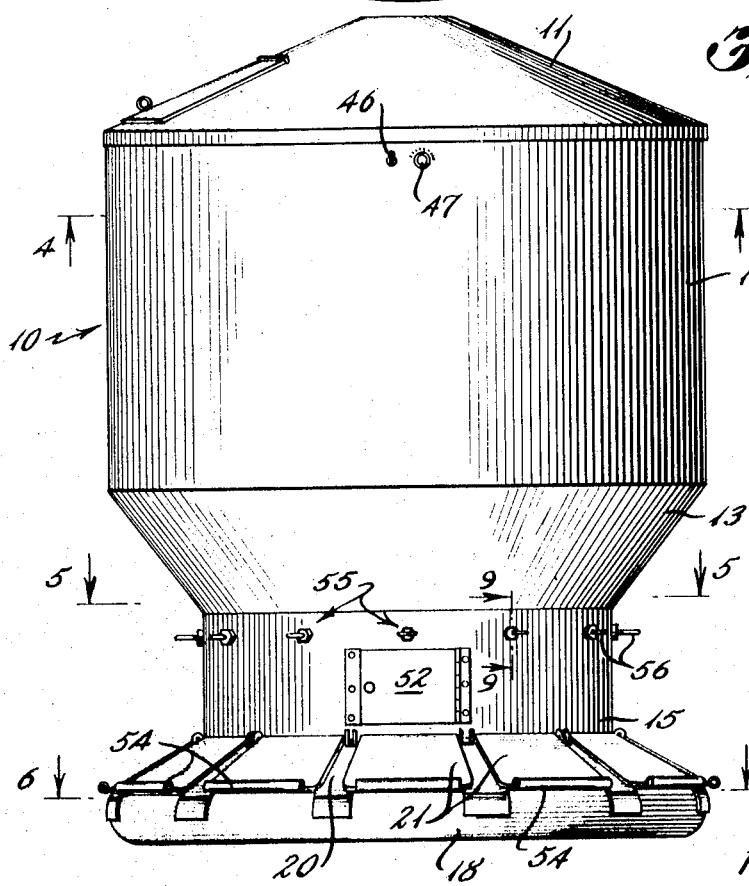
FIG. 2 is a side elevation thereof.
Figure 5:
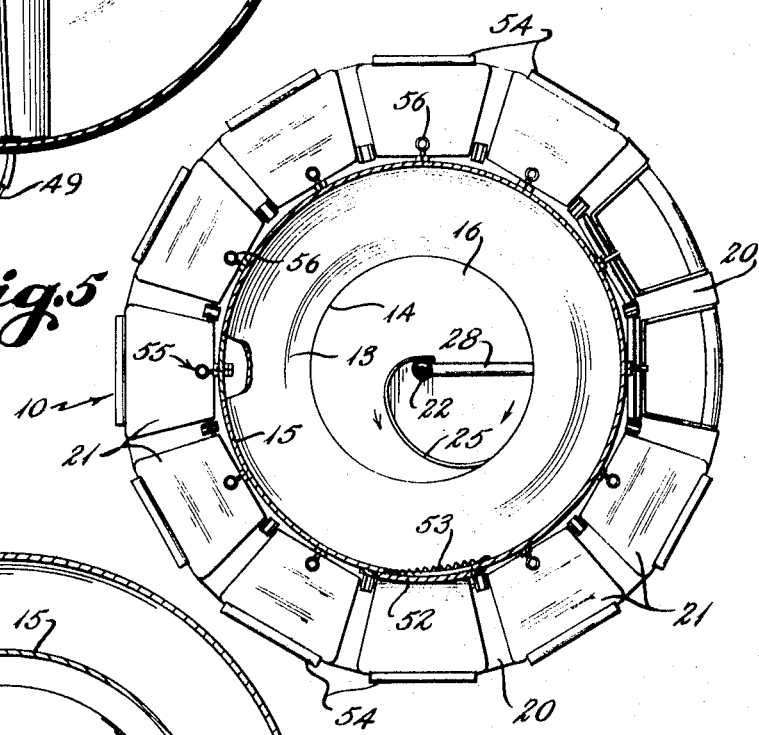
FIG. 5 is a section on the line 5—5 of FIG. 2.
Figure 6:
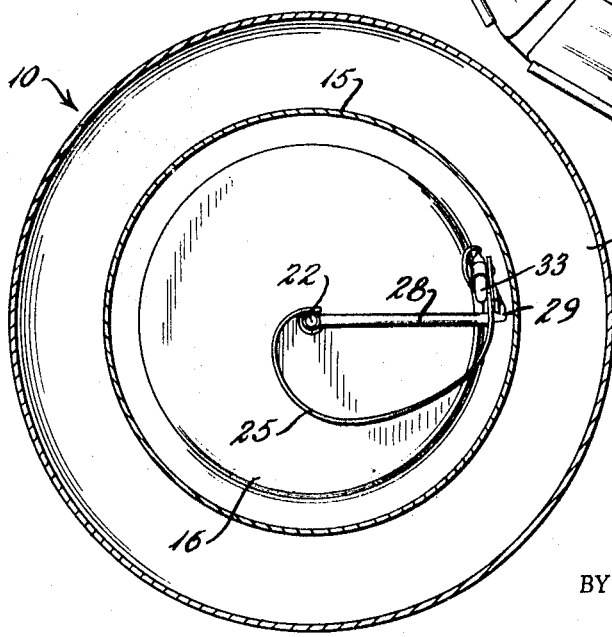
FIG. 6 is a section on the line 6—6 of FIG. 2.

As illustrated in FIGS. 2 and 5, an access door 52 is hingedly mounted on the skirt 15 and normally is maintained closed by a spring 53. Opening of the door 52 will provide access to the paddle 29 and mercury switch 34 for adjustments thereto.

Normally the doors 21 are closed to prevent the ingress of rain or other moisture, and when a pig or hog wishes to feed he raises a door with his snout so that the feed within the trough 18 is available to him. The doors 21 have a rolled edge 54 on the side remote from the hinge to prevent damage to the animal's snout when the animal raises the door. Older pigs soon learn to open the doors 21 with their snouts; however, young piglets up to about a month old have tender snouts and rubbing the snout against the door may cause a disease known as rhinitis.

Figure 9:
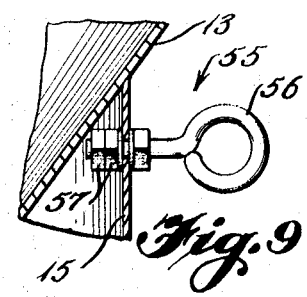
FIG. 9 is an enlarged section on the line 9—9 of FIG. 2.
Figure 4:
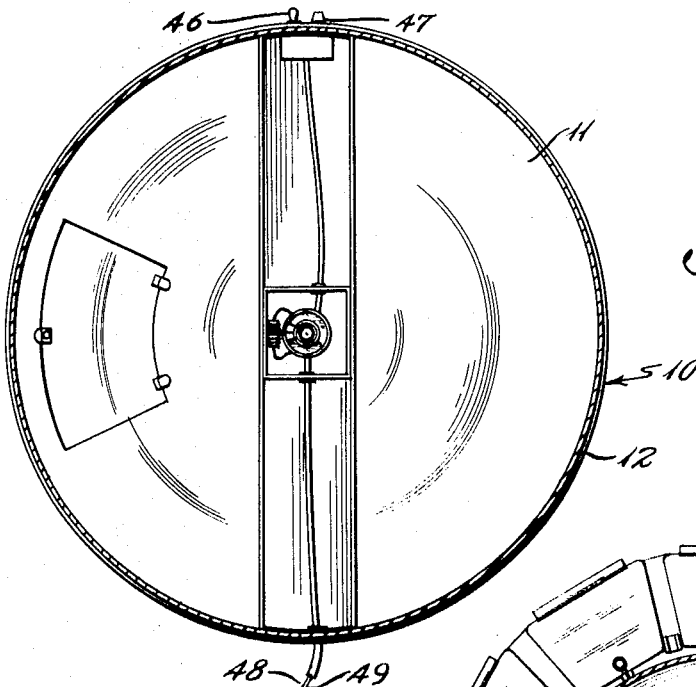
FIG. 4 is a section on the line 4—4 of FIG. 2.

To prevent this disease, a simple latch mechanism 55, illustrated best in FIGS. 3 and 9, is provided including an eyebolt 56 rotatably mounted in the upper portion of the skirt 15 and frictionally held by nuts 57. When the eye of the bolt 56 is in generally horizontal position, the door 21 can be raised until the rolled edge 54 engages the skirt 15 beneath the eyebolt 56 and thereafter the eye is rotated substantially 90° to overlie the edge of the door and prevent the closing thereof. In this manner any or all of the doors 21 can be latched open so that the piglets will have access to the feed without causing rhinitis. After the piglets have matured and their snouts have toughened, the doors 21 may be released from the latch mechanism 55 so that they remain in the lower position.

With reference to FIGS. 10-12, instead of the stationary floor 16 and the rotatable sweep arm 25, the lower end of the shaft 22 extends into the area between the downwardly extending walls 17 and is rotatably supported by a spider 58. In this modification the fixed floor 16 is removed and the upper end of the wall 17 is left open and if desired may have a reinforcing band 59 applied thereto. A rotatable floor 60 is fixed to the shaft 22 in any desired manner, as by a setscrew 61, and such floor is located closely adjacent to the upper end of the wall 17. At the outer periphery of the floor 60 a lug 62 is welded or otherwise secured, and such lug is adapted to rotatably support the paddle 29 so that the paddle will rotate as the floor 60 is rotated. The electric lines 39 and 40 extend through an opening in the shaft 22 preferably beneath the floor 60 and thereafter extend outwardly to the mercury switch 34 carried by the paddle 29. In order to prevent damage to the electric lines as the floor 60 rotates relative to the wall 17, a sleeve 63 can be welded or otherwise attached to the floor 60 for receiving the electric lines 39 and 40 in the area of the wall 17.

In order to dispense feed evenly, a plurality of arcuate arms 64 are connected at one end to a central sleeve 65 disposed about the shaft 22. The arms 64 are welded or otherwise secured to the open end 14 of the frustoconical wall 13 so that feed will fall by gravity into the areas between the arcuate arms, and when the floor 60 is rotated, such feed will be forced outwardly beyond the periphery of the floor where it will fall by gravity into the trough 18.

In the operation of the device, the bin 10 can be filled with feed through an access opening in the cover 11 and thereafter the timing mechanism 47 can be set to operate at predetermined time intervals and the switch 46 moved to the "on" position. When the timing mechanism 47 completes a circuit to the powerplant 23, such powerplant will rotate the shaft 22 and cause the sweep arm 25 or the floor 60 to rotate and dispense feed into the trough 18. Operation of the powerplant will continue for a predetermined length of time so that a measured amount of feed will be discharged in the trough. However, if feed still remains in the trough from a previous discharge, the powerplant will be operated until the paddle 29 engages the upper level of the feed and tilts about the pivot 30 so that the mercury switch 34 will interrupt the flow of electric energy to the powerplant 23 and stop the discharge of additional feed into the trough.

In this system, fresh sweet feed is always available to the animals merely by raising the doors 21 with their snouts.

I claim:

1. A feeder for animals comprising a bulk feedbin having an upright axis and wall structure defining a lower circular discharge opening, a relatively flat floor located beneath and in generally parallel relation to said discharge opening, said floor having a periphery substantially equally spaced from the discharge opening and providing for substantially uniform discharge around such floor, a trough around the periphery of said floor for receiving feed discharged and falling by gravity from said floor, agitation means operatively associated with said floor, a shaft disposed axially within said bin, one of said floor and agitator means being connected to said shaft to be driven thereby for discharging feed, means for driving said shaft, and means for controlling the operation of said driving means subject to the contents of said trough, said means for controlling the operation of said driving means including feed-actuated switch means carried by said one of said floor and agitator means, said switch means mounted to engage feed in said trough and responsive to the height of the feed.

2. The structure of claim 1 in which said agitator means includes at least one sweep arm which extends beyond the periphery of said floor.

3. The structure of claim 1 in which said agitator means is fixed to said shaft adjacent said floor for sweeping grain from said floor into said trough.

4. The structure of claim 1 in which said floor is fixed to said shaft to rotate therewith, and cooperating fixed arms of a configuration to discharge feed outwardly beyond the periphery of said floor into said trough.

5. The structure of claim 1 and a cover having a series of selectively operable doors for said trough with means whereby said covers may be supported in raised position.

6. The structure of claim 1 in which said switch means includes a paddle swingably mounted on one of said floor and agitator means connected to said shaft, electric contact means carried by said paddle, and means for limiting movement of said paddle in at least one direction.

7. The structure of claim 6 in which said switch means includes a mercury switch having a freely movable globule of mercury.

8. The structure of claim 1 in which said driving means includes a variable speed motor means.

9. The structure of claim 1 including time control means for controlling the timing and duration of said means for driving said shaft.